(12) United States Patent
Komatsu (10) Patent No.: US 12,219,109 B2
(45) Date of Patent: Feb. 4, 2025

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Kohei Komatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/501,464

(22) Filed: Nov. 3, 2023

(65) Prior Publication Data

US 2024/0064253 A1  Feb. 22, 2024

Related U.S. Application Data

(63) Continuation of application No. 17/459,970, filed on Aug. 27, 2021, now Pat. No. 11,838,473.

(30) Foreign Application Priority Data

Sep. 9, 2020  (JP) .................................. 2020-151317

(51) Int. Cl.
*H04N 1/00* (2006.01)
*H04N 1/21* (2006.01)

(52) U.S. Cl.
CPC ....... *H04N 1/2104* (2013.01); *H04N 1/00307* (2013.01); *H04N 1/00413* (2013.01); *H04N 1/00482* (2013.01)

(58) Field of Classification Search
None
See application file for complete search history.

(56) References Cited

U.S. PATENT DOCUMENTS

| 2003/0170060 A1* | 9/2003 | Nakadaira ............. G06F 3/1253 400/76 |
| 2004/0170443 A1* | 9/2004 | Maeshima ............. G03G 15/50 399/82 |
| 2005/0198072 A1* | 9/2005 | Linuma .............. H04N 1/00464 |
| 2009/0138808 A1 | 5/2009 | Moromisato |
| 2009/0292708 A1* | 11/2009 | Sato ................... H04N 1/32101 |

(Continued)

FOREIGN PATENT DOCUMENTS

| CN | 109104541 A | 12/2018 |
| CN | 110532764 A | 12/2019 |

(Continued)

*Primary Examiner* — Beniyam Menberu
(74) *Attorney, Agent, or Firm* — Canon U.S.A., Inc. IP Division (57) ABSTRACT

A method for an information processing apparatus capable of executing an application that runs on an operating system includes determining whether data is writable by the application into a folder associated with the application, instructing the operating system to display a screen for permitting the application to write the data into the folder in a case where it is determined that the data is not writable into the folder associated with the application, the screen being a screen using Storage Access Framework (SAF), and writing the data into the folder, wherein, at a time of the writing, the data is written into the folder into which the application is permitted to write the data by an operation accepted on the screen.

15 Claims, 12 Drawing Sheets

(56) References Cited

U.S. PATENT DOCUMENTS

| | | | | |
|---|---|---|---|---|
| 2012/0257233 A1* | 10/2012 | Kishida | ............ | H04N 1/00973 |
| | | | | 358/1.13 |
| 2018/0364963 A1* | 12/2018 | Mihira | .................... | H04L 67/06 |
| 2018/0367520 A1* | 12/2018 | Takigawa | ................ | H04L 63/08 |
| 2020/0019718 A1 | 1/2020 | Lin | | |
| 2020/0288027 A1* | 9/2020 | Hoshino | ............ | H04N 1/00482 |

FOREIGN PATENT DOCUMENTS

| | | | | | |
|---|---|---|---|---|---|
| JP | 2008005023 | A | | 1/2008 | |
| JP | 2008152363 | | * | 7/2008 | ............ G06F 21/31 |
| JP | 2012088912 | | * | 5/2012 | ............ G06F 17/21 |
| JP | 2018052087 | A | | 4/2018 | |
| JP | 2019053466 | A | | 4/2019 | |

* cited by examiner

INFORMATION PROCESSING APPARATUS, STORAGE MEDIUM, AND CONTROL METHOD

CROSS-REFERENCE TO RELATED APPLICATIONS

This application is a continuation application of U.S. patent application Ser. No. 17/459,970, filed on Aug. 27, 2021, which claims the benefit of Japanese Patent Application No. 2020-151317, filed Sep. 9, 2020, each of which is hereby incorporated by reference herein in its entirety.

BACKGROUND OF THE DISCLOSURE

Field of the Disclosure

The present disclosure relates to an information processing apparatus, a storage medium, and a control method.

Description of the Related Art

In recent years, as mobile terminals have been widely used, companies have increasingly employed mobile terminals as their business terminals. Using a mobile terminal in which an application for instructing an image processing apparatus such as a copying machine or a printer to execute processing is installed, a user can instruct the image processing apparatus to execute printing or scanning. For example, the user makes scan settings on the application and then transmits a scan execution instruction to the image formation apparatus. Upon receipt of the execution instruction, the image formation apparatus executes the scan process in accordance with the settings. The image data generated by the scan process is saved in a folder in the mobile terminal set in the application. In many cases, the folder as the saving destination is generated when the application is initially started up, and the folder is automatically set as the destination to save data in the application.

Japanese Patent Application Laid-Open No. 2019-8370 describes that image data scanned and generated by an image processing apparatus is stored in a predetermined folder within a mobile terminal, and discusses a method for enhancing the convenience of accessing the image data saved in the folder.

The folder used as the destination to save data by the application may become unavailable due to changes in the specification of the operation system (OS) or the like. Taking Android (registered trademark) as an example, in order to access an arbitrary folder in a mobile terminal from each application in the OS of a predetermined version or later, it is mandatory to acquire a permission to access the folder. That is, due to an update of the OS, the application may no longer be allowed to access and use the folder that has been used before as the saving destination.

Thus, there is a need in the art for a method of enabling appropriate data saving even if the folder having been used as the destination to save data by the application is unavailable.

SUMMARY

A method for an information processing apparatus capable of executing an application that runs on an operating system includes determining whether data is writable by the application into a folder associated with the application, instructing the operating system to display a screen for permitting the application to write the data into the folder in a case where it is determined that the data is not writable into the folder associated with the application, the screen being a screen using Storage Access Framework (SAF), and writing the data into the folder, wherein, at a time of the writing, the data is written into the folder into which the application is permitted to write the data by an operation accepted on the screen.

Further features of the present disclosure will become apparent from the following description of exemplary embodiments with reference to the attached drawings.

DESCRIPTION OF THE EMBODIMENTS

Exemplary embodiments will be described with reference to the attached drawings. All of the combinations of features described in relation to the exemplary embodiments are not necessarily essential for the solution of the present disclosure.

Figure 1:
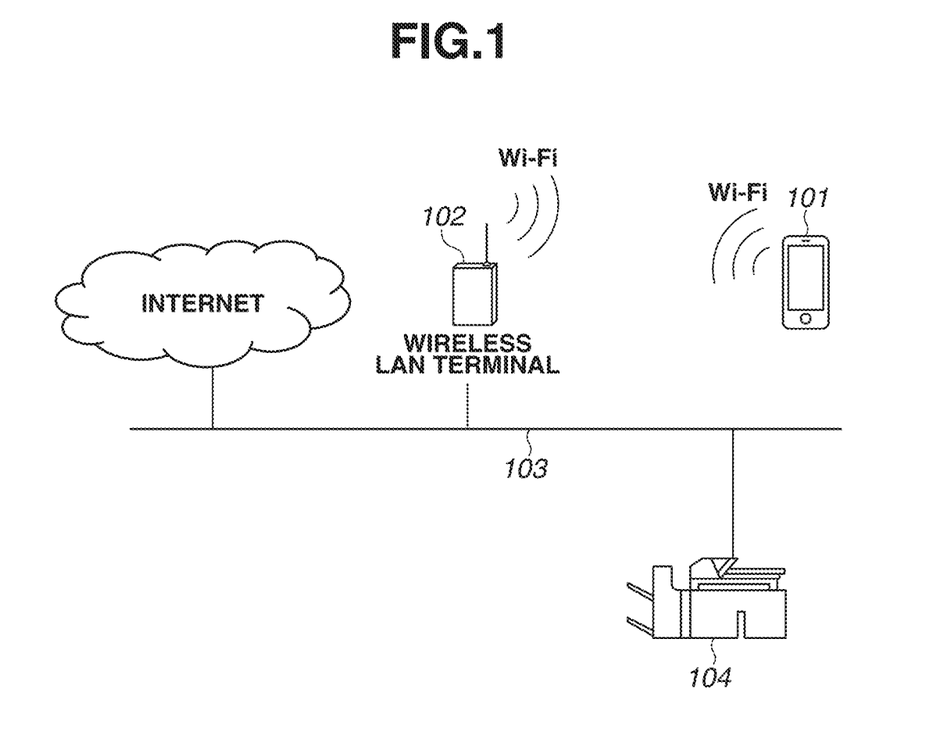
FIG. 1 is a diagram illustrating a system configuration of the present disclosure.

A first exemplary embodiment will be described in detail with reference to the drawings. FIG. 1 is a diagram illustrating an information processing system in the present exemplary embodiment. Referring to FIG. 1, a data processing apparatus 101 is an information processing apparatus that is used to transmit print jobs and scan jobs to an image processing apparatus 104 and accepts various operations from the user on the information processing apparatus. The data processing apparatus 101 is a mobile terminal, for example, such as a smartphone or a tablet. The image processing apparatus 104 may include, besides the scan function, a copy function, a print function, a fax function, and the like. The data processing apparatus 101 and the image processing apparatus 104 are connected to a local area network (LAN) 103 to communicate with each other via the LAN 103. A wireless LAN terminal 102 is a wireless LAN parent machine that has general network/router functions to provide a wireless LAN at home or in an office. The data processing apparatus 101 enables the wireless LAN function to participate in the LAN 103 via the wireless LAN terminal 102. Once entering the wireless LAN area provided by the wireless LAN terminal 102, the data processing apparatus 101 can automatically participate in the LAN 103, using authentication information preset in the data processing apparatus 101.

Figure 2:
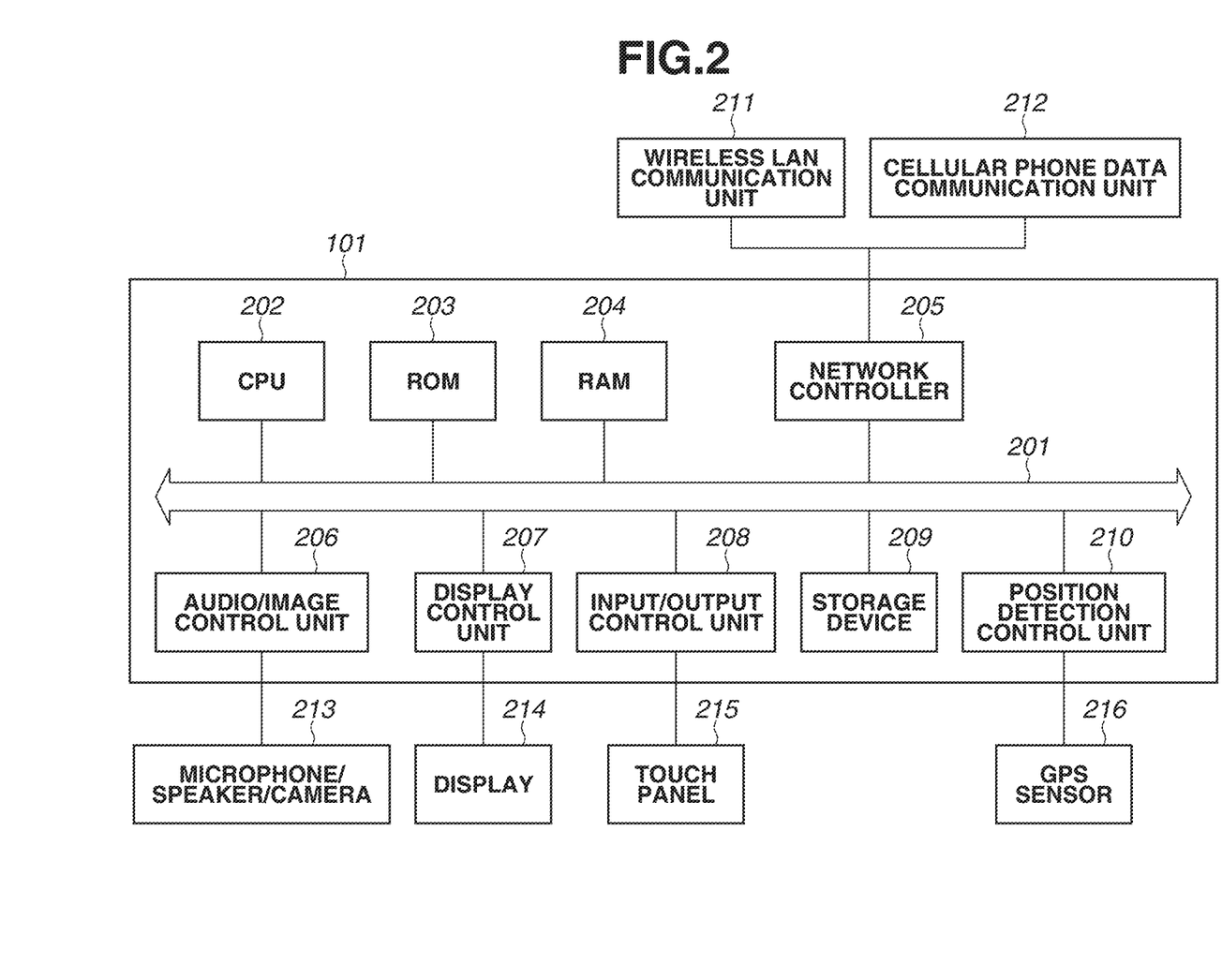
FIG. 2 is a diagram illustrating a hardware configuration of a data processing apparatus.

FIG. 2 is a block diagram illustrating a hardware configuration of the data processing apparatus 101 illustrated in FIG. 1. The data processing apparatus 101 is a terminal such as a tablet or a smartphone. An operating system for small-sized terminals and programs for controlling phone calls and data communication may run on the data processing apparatus 101. Alternatively, the data processing apparatus 101 may be a personal computer that does not include an audio/image control unit 206, a microphone/speaker/camera 213, a position detection control unit 210, a GPS sensor 216, and a cellular phone data communication unit 212, which will be described later.

The hardware components are connected to a system bus 201. A ROM 203 stores the operating system for the data processing apparatus 101 and applications for controlling phone calls and data communication, which are executed by a CPU 202. The applications for controlling data communication include applications for exchanging various data with the image processing apparatus 104, e-mail programs, web browsers, and the like.

A RAM 204 is a memory for executing programs and a work memory area where programs are executed by applications. The RAM 204 is also a memory that temporarily stores data to be temporarily saved when programs are executed by the applications. A storage device 209 is a non-volatile storage device that stores various operation mode settings to be held even after the data processing apparatus 101 is restarted, operation logs, and the like.

A network controller 205 performs communication control by the wireless LAN communication unit 211 for participating in the LAN 103 via the wireless LAN terminal 102 and by the cellular phone data communication unit 212 for participating in networks provided by a mobile carrier.

The audio/image control unit 206 is used, for example, by the user to activate a phone call application and make a phone call. The microphone/speaker 213 performs inputs and outputs of audio data, and the audio/image control unit 206 intermediates between the audio data and the audio data control program. The audio/image control unit 206 intermediates between image data captured and generated by the camera 213 and the image data control program.

A display control unit 207 controls information to be output on a display 214 of the data processing apparatus 101. An input/output control unit 208 controls information specified by the user with buttons or a touch panel 215 of the data processing apparatus 101. Using the audio/image control unit 206, the display control unit 207, and the input/output control unit 208, the application running on the data processing apparatus 101 provides the user with network communication information and various types of information related to the data processing apparatus 101.

The position detection control unit 210 acquires positional information about the data processing apparatus 101 from a GPS sensor 216 and provides the information on the operating system. These operations are controlled by the operating system (OS) running on the CPU 202.

Figure 3:
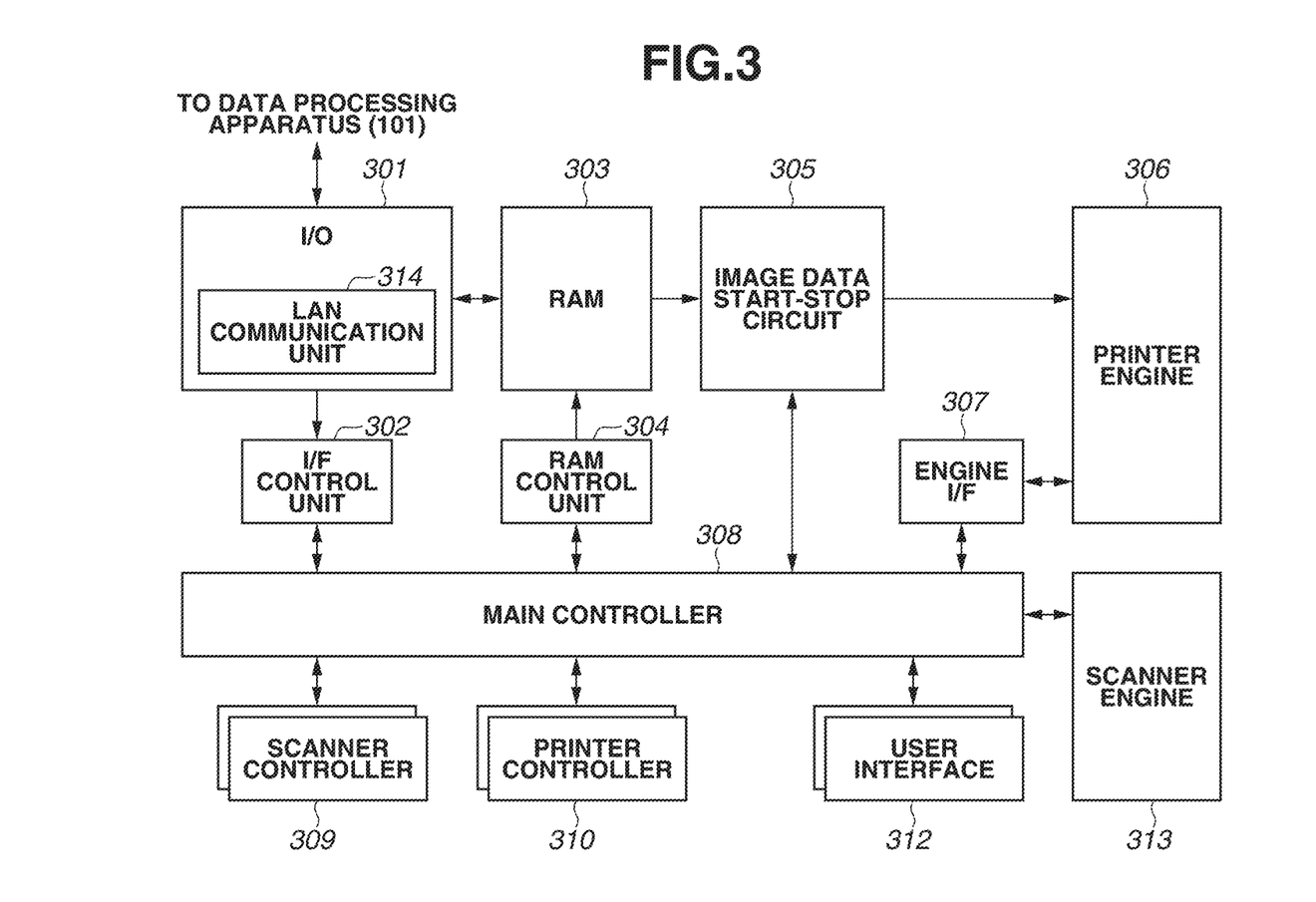
FIG. 3 is a diagram illustrating a hardware configuration of an image processing apparatus.

FIG. 3 is a diagram illustrating a hardware configuration of the image processing apparatus 104 illustrated in FIG. 1. The example illustrates a multi-function peripheral (MFP) having a scanner function and a printer function.

Referring to FIG. 3, an input-output (I/O) 301 includes a LAN communication unit 314. The LAN communication unit 314 is communicable with the data processing apparatus 101 via the network (LAN) 103 or the like. For example, the LAN communication unit 314 transmits image data scanned and generated by the image processing apparatus 104 to the data processing apparatus 101 via the LAN. A plurality of I/Os 301 may be provided to support a plurality of connection forms. Through the I/O 301, the image processing apparatus 104 passes a device ID and scan images to the data processing apparatus 101. The image processing apparatus 104 performs processing in response to various control commands from the data processing apparatus 101. An interface (UF) control unit 302 performs a control to issue a device ID to a processing system such as a scanner, a printer, or a fax included in the image processing apparatus 104. The RAM 303 is used to store external data such as control commands acquired by the I/O 301 and image data (or picture data, hereinafter called images) read by a scanner engine 313. The RAM 303 is further used to store images developed by a printer controller 310 before passing to a printer engine 306. The allocation of the RAM 303 is managed by a RAM control unit 304. An image data start-stop circuit 305 outputs images developed by the printer controller 310 or images taken by the scanner engine 313 and developed in the RAM 303, in time with the rotation of the printer engine 306. The printer engine 306 is a device that develops images on output media such as paper. A main controller 308 performs various controls of the printer engine 306 by an engine OF 307. A main controller 308 is a main control module that performs an appropriate process of distributing control languages received from the data processing apparatus 101 via the I/O 301, to a scanner controller 309 and the printer controller 310. The main controller 308 further controls the printer engine 306 and the scanner engine 313 under instructions from the above-mentioned controllers and a user interface 312. The scanner controller 309 decomposes a scan control command received from the data processing apparatus 101 into internal execution orders that are interpretable for the main controller 308. The scanner controller 309 changes images read by the scanner engine 313 into scan control commands. The printer controller 310 decomposes a page description language (PDL) received as a print job from the data processing apparatus 101 into internal execution orders including developed images that are interpretable by the main controller 308. The developed images are delivered to the printer engine 306 and printed on output media such as paper sheets.

Figure 4:
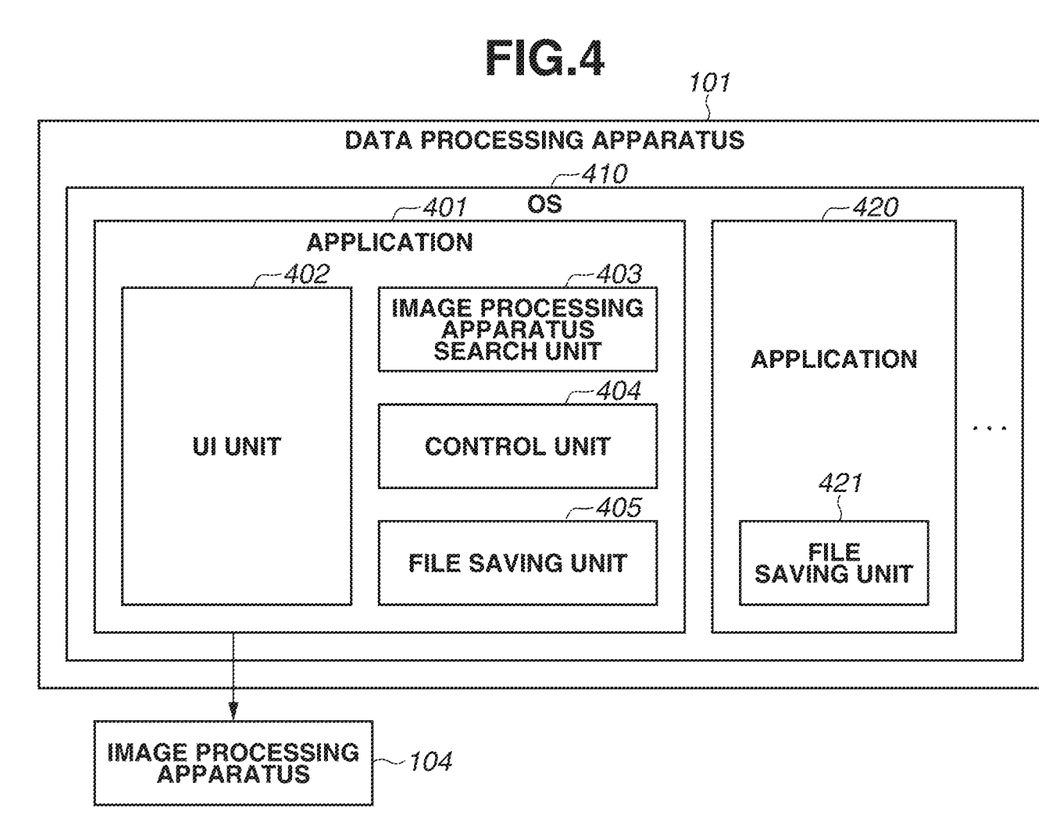
FIG. 4 is a diagram illustrating a software configuration of a data processing apparatus.

FIG. 4 is a block diagram illustrating a software configuration of the data processing apparatus 101 illustrated in FIG. 1. An application 401 to be executed by the data processing apparatus 101 is installed in the ROM 203, as an application to run on an OS 410. The application 401 is an application for issuing a print instruction or a scan instruction to the image processing apparatus 104. For example, the application 401 is an application that transmits a scan instruction to the image processing apparatus 104, receives image data scanned and generated by the image processing apparatus 104 under the instruction, and saves the image data in a storage of the data processing apparatus 101. The application 401 also has the function to save images captured by the camera 213 included in the data processing apparatus 101. A user interface (UI) unit 402 is a UI unit of the application 401, which provides a user interface for allowing the user to set functions inherent in the application. An image processing apparatus search unit 403 is a search unit of the image processing apparatus 104, which searches for a network device on the LAN 103 in which the data processing apparatus 101 participates. More specifically, the data processing apparatus 101 searches for an image processing apparatus to which a print or scan instruction can be issued. A control unit 404 controls various processes performed by the application 401. For example, the control unit 404 generates a print job or a scan job and transmits the generated job to a communicable image processing apparatus. The control unit 404 performs a process of saving data generated by the application 401. A file saving unit 405 saves files generated or received by the application 401. For example, the file saving unit 405 receives image data scanned and generated by the image processing apparatus 104 from the image processing apparatus 104 and saves the image data. The data saved in the file saving unit 405 can be referenced to and used by the application 401 and other applications.

For example, when the application 401 is started up for the first time, a folder corresponding to the file saving unit 405 in which data is to be stored is automatically generated. Subsequently, image data (scan data) generated by scanning and image data captured by the camera are saved in the generated folder.

An application 420 is an application that possesses functions similar to those of the application 401 and has a file saving unit 421. Applications installed in the data processing apparatus 101 are not limited to these applications but may include other applications.

Figure 5:
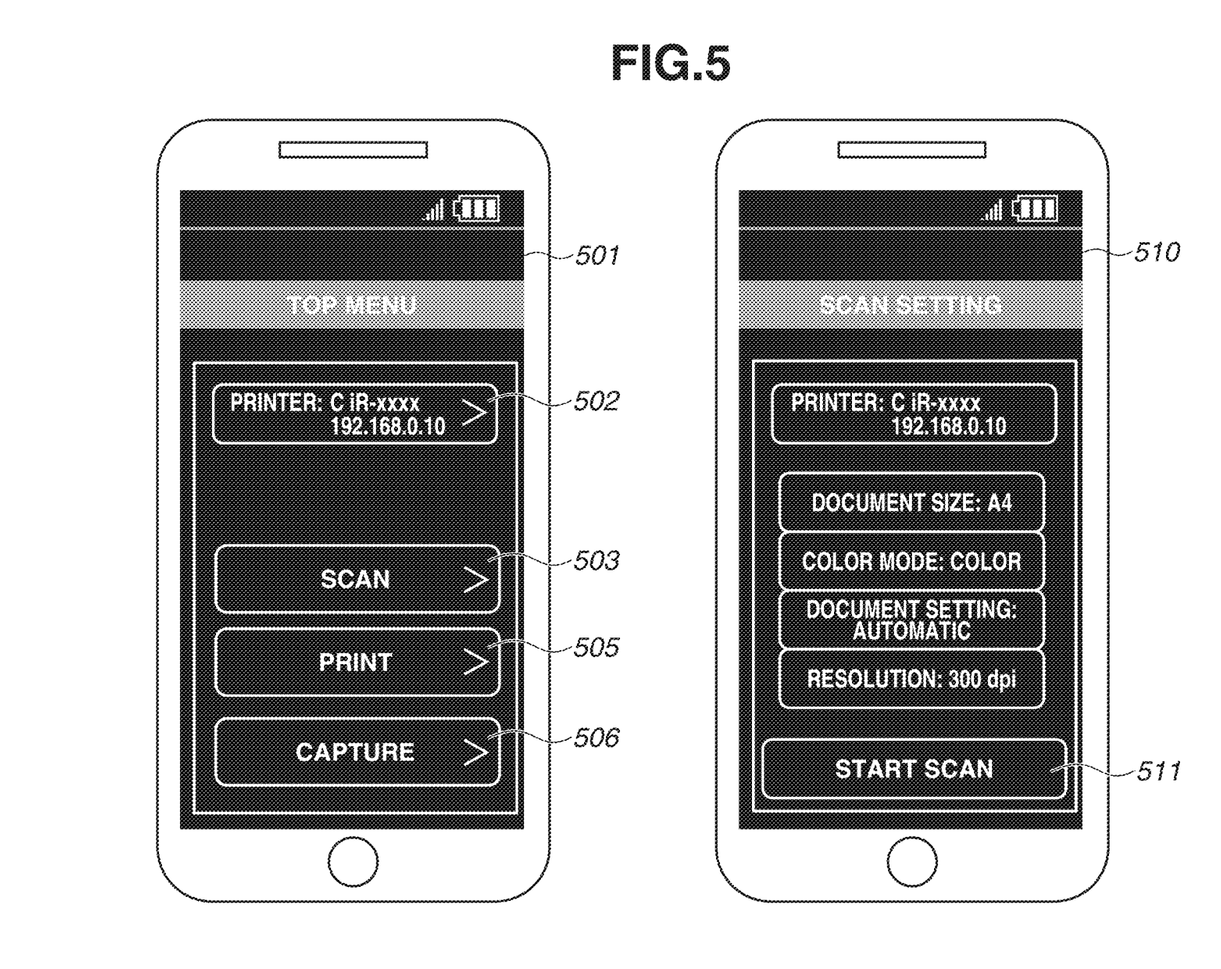
FIG. 5 is a diagram illustrating screen examples displayed by an application running on the data processing apparatus.

FIG. 5 is a diagram illustrating screen examples where the application 401 transmits a scan job to the image processing apparatus 104. A menu screen 501 is a top menu screen that is displayed immediately after the application 401 is started up, and various input operations from the user will be accepted on the menu screen 501. A selection button 502 is a button to move to a screen for selecting an image processing apparatus to which a print or scan execution instruction is to be issued. The selection button 502 presents information related to the currently selected image processing apparatus. In this example, the printer "C iR-xxxx" corresponding to the image processing apparatus 104 is selected as an apparatus to which a print or scan instruction is to be issued.

A scan button 503 is a button to move to a setting screen for issuing a scan instruction to the image processing apparatus 104. In the lower part of the scan button 503, the name of the destination in the data processing apparatus 101 where image data scanned and generated by the image processing apparatus 104 is to be saved may be displayed. In the example, the destination folder is set to the "application 401" folder. The folder is automatically generated in the storage area of the data processing apparatus 101 when the application 401 is started up for the first time or the like, and is preset as the image data storage destination of the application 401. The "application 401" folder corresponds to the file saving unit 405, and the stored data can be referenced to, used, and executed by other applications.

A print button 505 is a button to move to a setting screen for issuing a print instruction to the image processing apparatus 104. A capture button 506 is a button to move to a screen for image capturing by the camera included in the data processing apparatus 101. The captured and generated image data is stored in the "application 401" folder.

A scan setting screen 510 is a screen that is displayed when the user presses the scan button 503. When the user makes scan settings and presses a scan start button 511, the scan job is transmitted to the image processing apparatus 104. The image processing apparatus 104 executes scanning based on the scan job, and transmits the generated image data to the data processing apparatus 101. The data processing apparatus 101 stores the transmitted image data in the "application 401" folder.

Figure 6A:
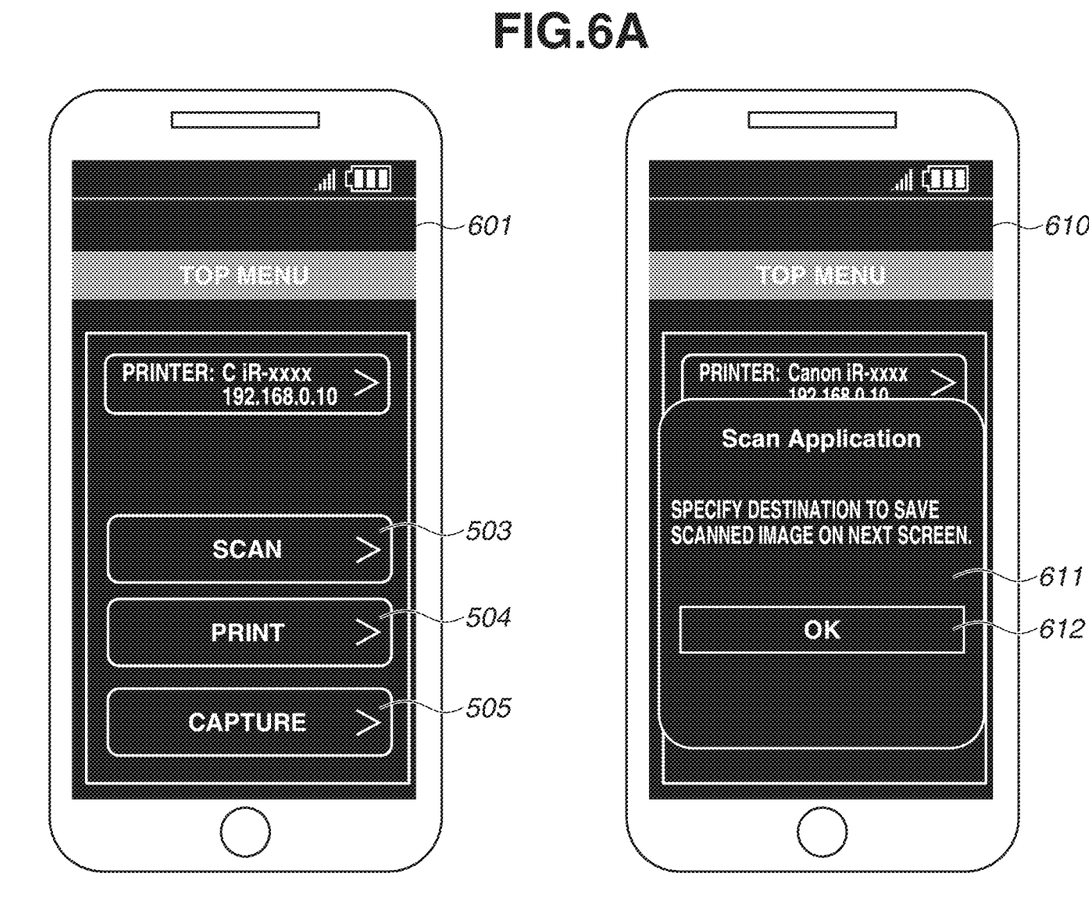
FIGS. 6A and 6B are diagrams illustrating screen examples displayed by the application running on the data processing apparatus.
Figure 6B:
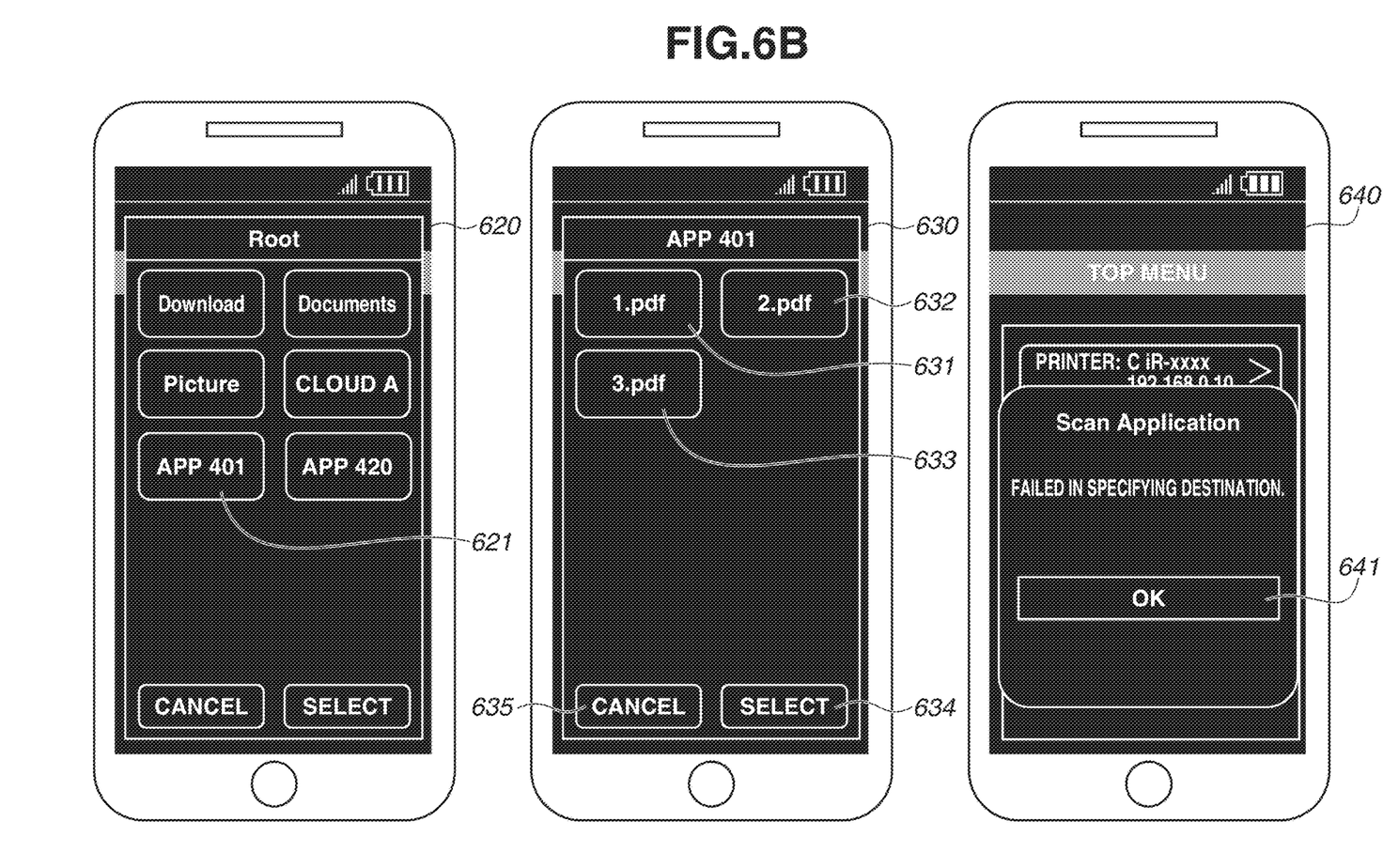

FIGS. 6A and 6B illustrate screen examples where the user attempts to issue a scan instruction in a case where the destination to save image data generated or received by the application 401 is not available to the application 401.

Due to an upgrade of the OS or the like, the destination folder to save data preset in the application 401 may become unavailable. Taking Android (registered trademark) as an example, each application cannot access the folder in the OS of Version 10 or later without a permission to access the folder. That is, if the user who has installed the application 401 in Android of Version 9 or earlier and used the "application 401" folder as the destination to save data, upgrades Android to Version 10, the "application 401" folder is no longer available. In order to use the "application 401" folder again in the application 401, the user needs to obtain a permission to access the folder via Storage Access Framework (SAF) that is the framework of the OS.

The OS 410 provides the SAF as the framework for the applications. The SAF offers various applications running on the OS 410 the function to access various files inside and outside the data processing apparatus 101 and the function to grant access permission. Specifically, each application uses an Intent to call the file selection function offered by the SAF. Upon acceptance of the call from the Intent, the OS 410 displays a UI for selecting the folder with the file browse function provided by the OS 410. The selectable folders are folders included in the storage of the OS 410 (for example, the "application 401" folder) and folders included in the storage of a cloud communicable with the data processing apparatus 101. Once the application acquires a permission to access a folder on the UI displayed using the SAF, the application can use the folder since then.

An example where the application 401 acquires a permission to access the "application 401" folder via the SAF will be described with reference to FIGS. 6A and 6B.

A menu screen 601 is identical to the menu screen 501 but is in the state where the application 401 cannot access the "application 401" folder due to an upgrade of the OS or the like. When the user presses the scan button 503 in this state, a warning screen 610 is displayed. The warning screen 610 presents a warning message 611 indicating that the folder for storing the scanned image data is invalid. When the user presses an OK button 612, a folder selection screen 620 using the SAF is displayed by the OS 410. The folder selection screen 620 presents a list of folders accessible with the file browse function provided by the OS 410 such as the folders included in the storage of the OS 410. When the user presses an application 401 button 621, the display screen moves to an application 401 folder screen 630. The application 401 folder screen 630 presents a list of files (631 to 633) included in the application 401 folder. A select button 634 is a button for permitting the application 401 to access the "application 401" folder. When the user presses the select button 634, the application 401 is permitted to access the "application 401" folder, and the display screen moves to the scan setting screen 510. When the user issues a scan execution instruction on the scan setting screen 510, the scan data is stored in the folder that the application 401 is permitted to access (the "application 401" folder in this example). Since then, files to be stored by the application 401 are stored in the "application 401" folder that the application 401 is permitted to access.

On the other hand, when the user presses a cancel button 635, a warning screen 640 is displayed to notify the user that no file storage destination is specified, and the display screen returns to the menu screen 601.

Figure 7:
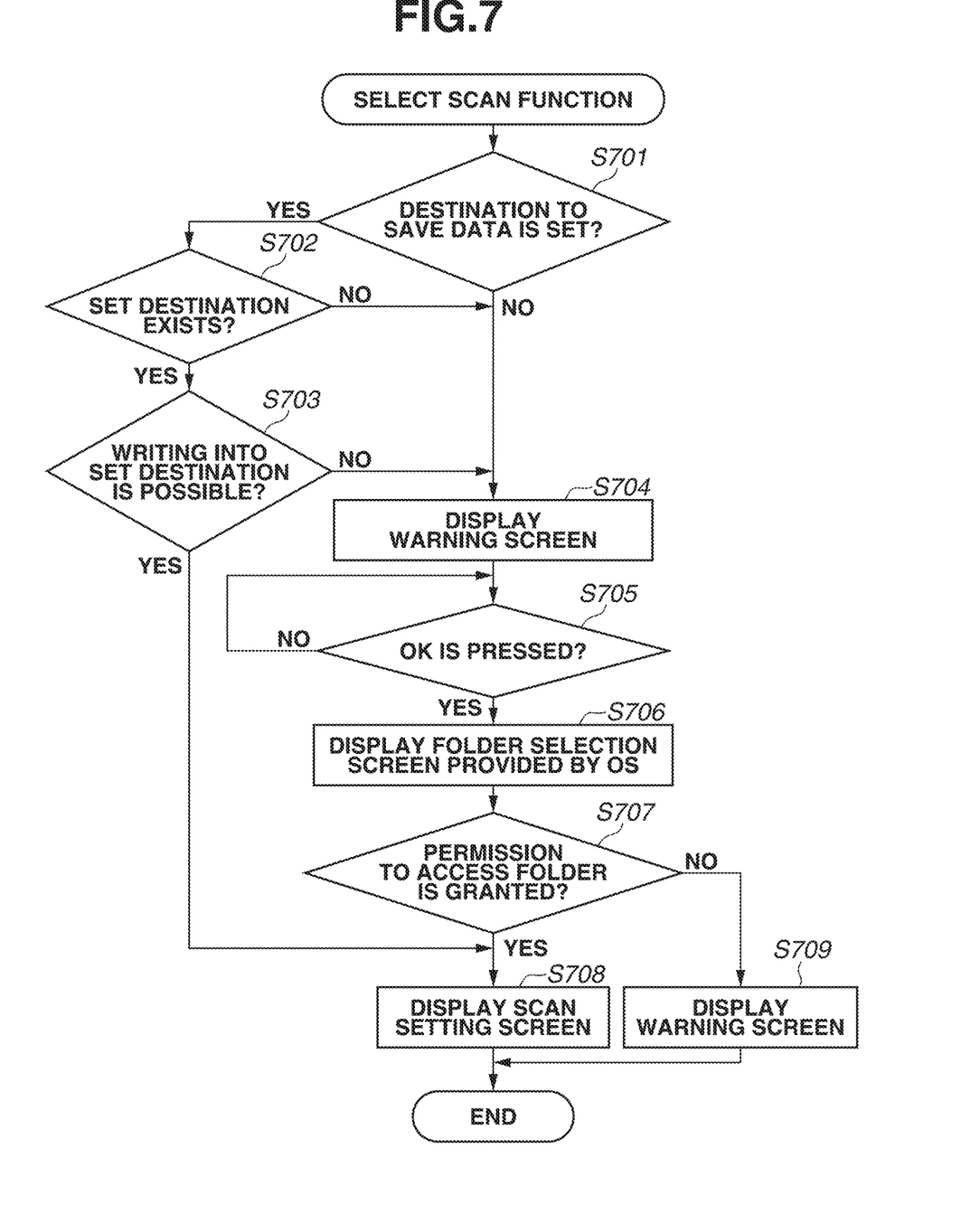
FIG. 7 is a flowchart illustrating a process flow of an application in a first exemplary embodiment.

A process related to the screen transitions illustrated in FIG. 6 will be described with reference to the flowchart of FIG. 7. The steps illustrated in FIG. 7 are performed by the CPU 202 executing a program stored in the ROM 203 or the storage device 209. The process in the flowchart of FIG. 7 is started when the user presses the scan button 503, for example.

In step S701, the control unit 404 determines whether the destination to save data is set in the application 401. The destination to save data here refers to the folder to store scan data transmitted from the image processing apparatus 104. If the saving destination is set (YES in step S701), that is, if the saving destination is associated with the application 401, the processing proceeds to step S702. In the other case (NO in step S701), the processing proceeds to step S704. The case where the saving destination is associated with the application 401 refers to the case where the destination to save data has been previously set in the application 401 or the case where access to the folder has been previously permitted in the folder selection screen 620 using the SAF.

In step S702, the control unit 404 determines whether the set saving destination is present. If the saving destination is present (YES in step S702), the processing proceeds to step S703. If the saving destination is not present (NO in step S702), the processing proceeds to step S704.

In step S703, the control unit 404 determines whether it is possible to write data into the saving destination set in the application 401. If it is possible to write data (YES in step S703), the processing proceeds to step S708. If it is not possible to write data (NO in step S703), the processing proceeds to step S704. Even if there is a limitation on the folders to which the application 401 is permitted to access due to changes in the specification of the OS or the like, detection can be made by the determination in step S703.

By the processing in above steps S701 to S703, it is possible to determine whether the application 401 can write data into the folder associated with the application 401. Even if the application becomes no longer accessible to the folder due to an upgrade of Android to Version 10, for example, it is possible to detect, by the determinations in these steps, that the folder cannot be used by the application 401.

In step S704, the UI unit 402 displays the warning screen 610 to notify the user that it is necessary to set the saving destination. In step S705, the UI unit 402 determines whether the OK button 612 has been pressed on the warning screen 610. If the control unit 404 determines that the OK button 612 has been pressed (YES in step S705), the processing proceeds to step S706. In the other case (NO in step S705), the control unit 404 repeats the processing in S705.

In step S706, the control unit 404 instructs the OS 410 to display the folder selection screen 620 using the SAF. At this time, the control unit 404 instructs the OS 410 to display the screen for permitting the application 401 to access a folder. When the user selects a folder as the destination to save data and presses the select button 634, the application 401 is permitted to access the selected folder.

In step S707, the control unit 404 determines whether the application 401 has been permitted to access the folder. If the control unit 404 determines that the control unit 404 has been permitted (YES in step S707), the processing proceeds to step S708. In the other case (for example, if the user has pressed the cancel button 635) (NO in step S707), the processing proceeds to step S709. In step S709, the UI unit 402 displays the warning screen 610 and the processing is terminated.

In step S708, the UI unit 402 displays the scan setting screen 510. When the user presses the scan start button 511, the scan job is transmitted to the image processing apparatus 104. The image processing apparatus 104 performs a scan process in accordance with the settings made on the scan setting screen 510, and transmits the scan image to the data processing apparatus 101. The transmitted scan image is stored in the folder that the application 401 is permitted to access.

The above processing in the flowchart is performed to determine whether the folder to store data is valid when the scan button 503 is pressed, as an example. The present exemplary embodiment is not limited to this example, and the same determination processing may be performed when the capture button 506 is pressed. The above-mentioned determination processing may be performed when the application 401 is started, not when the scan button 503 is pressed, and the warning screen may be presented if the folder is not valid. Further, the determination processing may be started and the warning screen may be displayed when the scan start button 511 is pressed. Alternatively, after the scan start button 511 is pressed, the determination processing may be started when the scan data is received, and the warning screen may be displayed.

According to the processing in the flowchart, even if the use of the folder to store data in the application is disabled due to an upgrade of the OS or the like, it is possible to notify the user of the effect. Further, if the use of the folder is disabled, it is possible to prompt the user to acquire a permission to access the folder. Since the warning screen is displayed only when the user intends to execute a process of saving data in the application (a scan or capture process in the present exemplary embodiment) (for example, when the user presses the scan button 503), it is possible to prevent unnecessary display of the warning screen which will leads to degradation in usability.

In the first exemplary embodiment, if the folder to save image data cannot be used by the application, the warning screen is displayed as an example. In a second exemplary embodiment, if the folder to save image data cannot be used when the image data is received, the image data is temporarily saved in a file temporary saving area of the application as an example. Later, the user can move the temporarily saved image data to a desired folder. The basic configuration of the present exemplary embodiment is the same as that of the first exemplary embodiment, and thus only differences from the first exemplary embodiment will be discussed.

Figure 8:
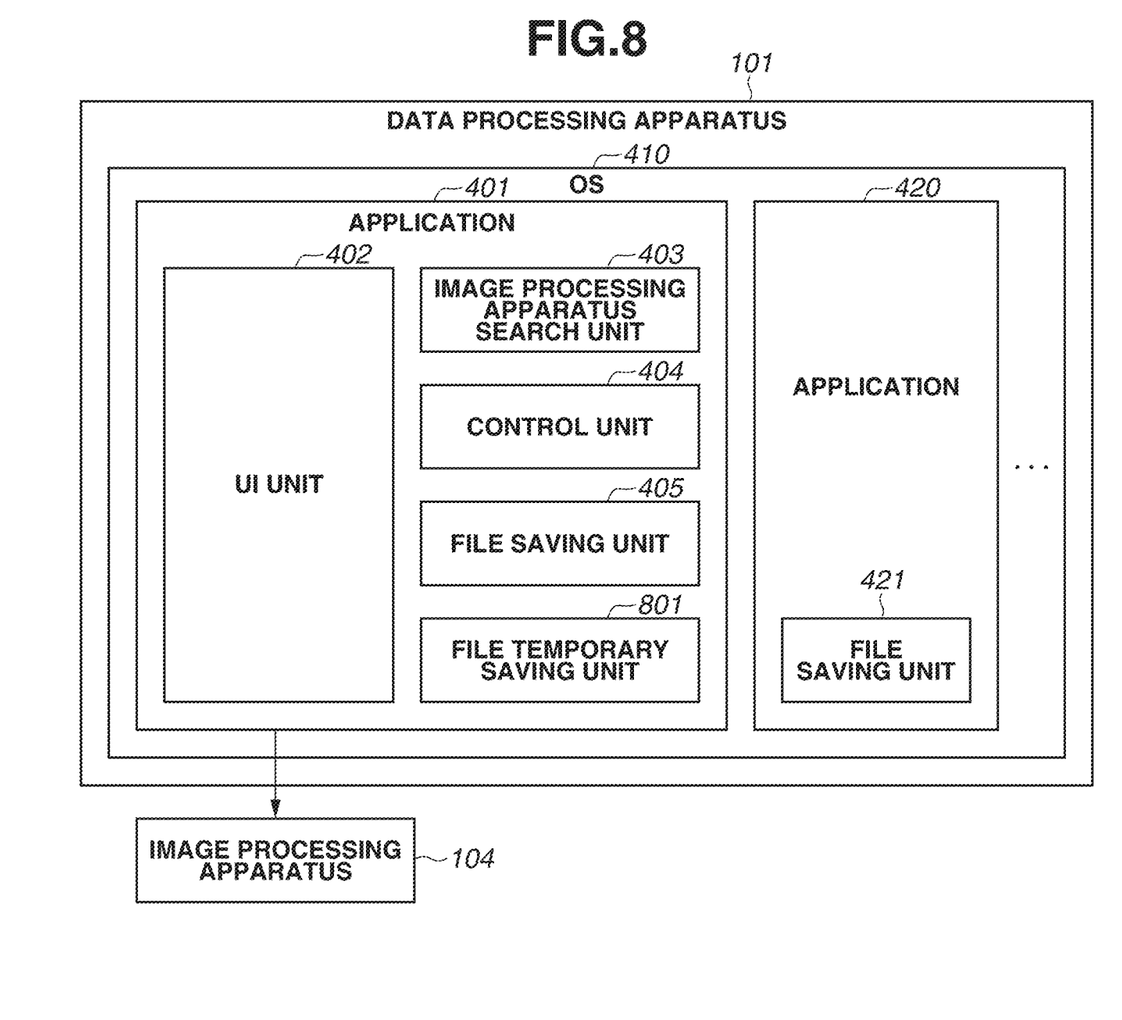
FIG. 8 is a diagram illustrating a software configuration of a data processing apparatus in a second exemplary embodiment.

FIG. 8 is a diagram illustrating a software configuration of a data processing apparatus 101 according to the present exemplary embodiment. The difference from the configuration of FIG. 4 is that an application 401 includes a file temporary saving unit 801. Unlike the file saving unit 405, the file temporary saving unit 801 is a file saving area inherent to the application 401, which cannot be referenced to or used by other applications. That is, the image data saved in the file temporary saving unit 801 can be used only by the application 401. The file temporary saving unit 801 corresponds to Sandbox or the like, for example.

Figure 9:
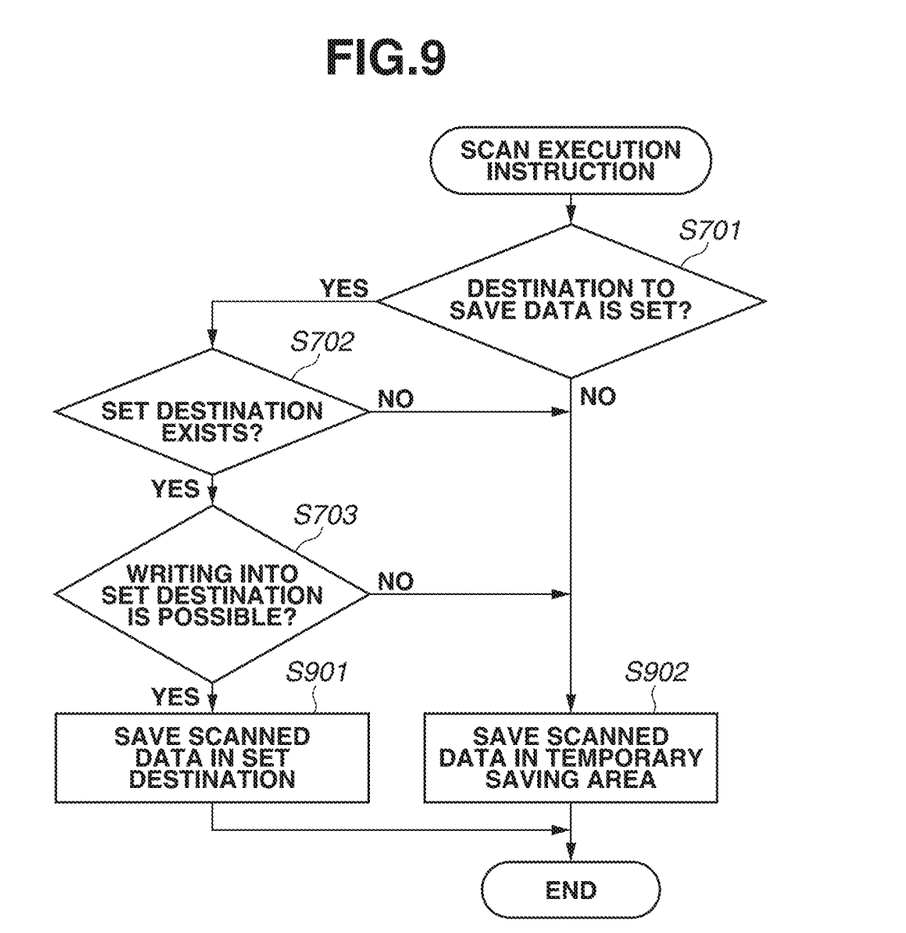
FIG. 9 is a flowchart illustrating a process flow of an application in the second exemplary embodiment.

FIG. 9 is a flowchart of a process of saving an image by the application 401 in the present exemplary embodiment. The steps in FIG. 9 are performed by a CPU 202 executing a program stored in a ROM 203 or a storage device 209. The processing in the flowchart of FIG. 9 is started when the user presses a scan start button 511, for example. In other words, the flowchart illustrates a process of receiving scan data by the application 401.

The processing in steps S701 to S703 is the same as that in FIG. 7 and thus description thereof will be omitted. In step S901, a control unit 404 saves received scan data in the saving destination set in the application 401. In other words, in a case where the set saving destination can be used, the control unit 404 saves the data in the saving destination.

In step S902, the control unit 404 saves the received scan data in the file temporary saving unit 801. In other words, in a case where the set saving destination cannot be used, the control unit 404 saves the data in the file temporary saving unit 801. The processing in step S902 is executed in a case where the saving destination folder previously used by the application 401 becomes unavailable due to an upgrade of the OS or the like. Further, the processing in step S902 is also executed by the user issuing a scan process instruction if access to the folder is not permitted in step S707 in FIG. 7.

By the above processing in the flowchart, it is possible to temporarily save image data even if the folder to save image data by the application becomes unavailable due to the specifications of the OS or the like.

Figure 10:
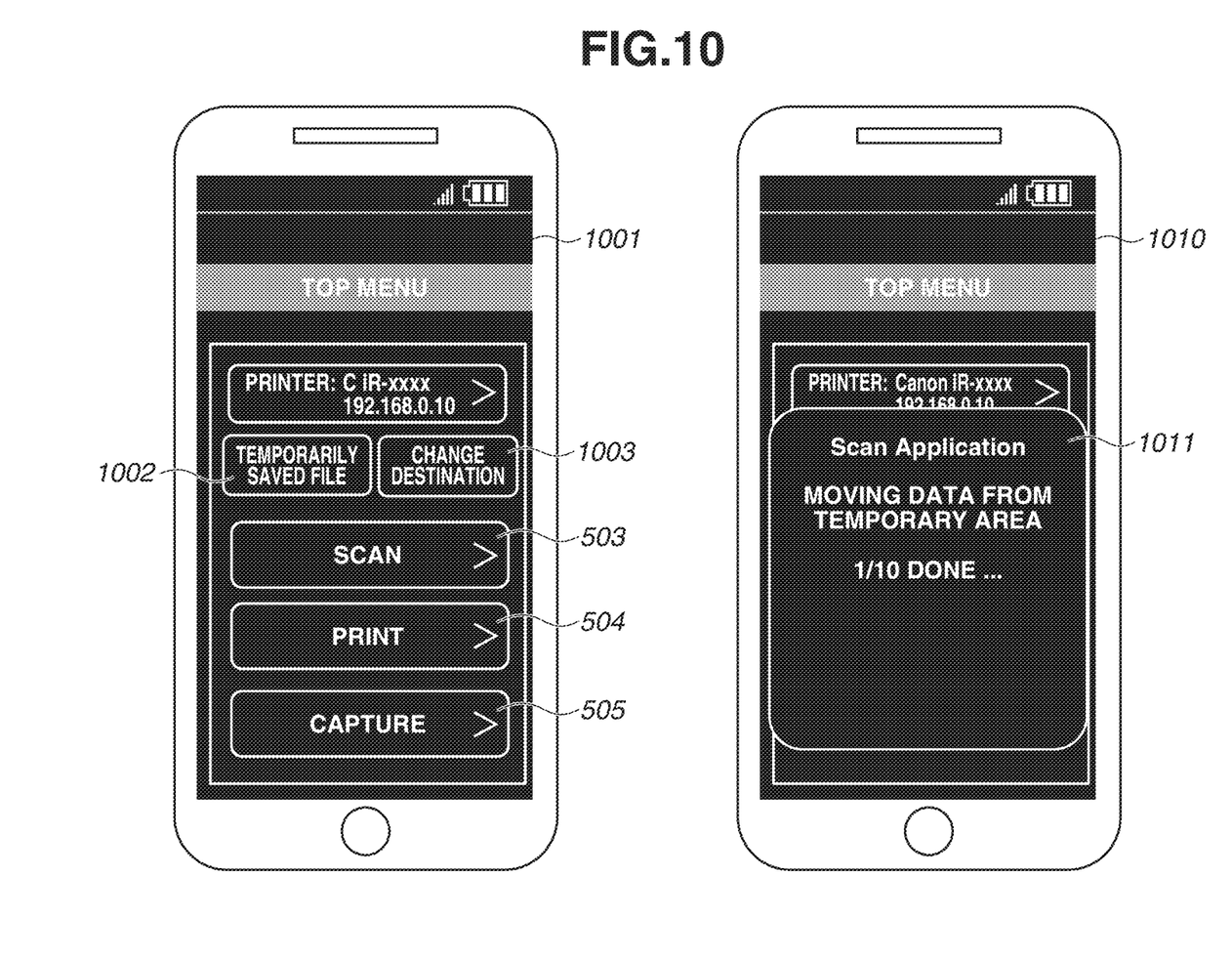
FIG. 10 is a diagram illustrating screen examples displayed by the application in the second exemplary embodiment.

An example where the user moves image data saved in the file temporary saving unit 801 to a desired folder will be described with reference to FIGS. 10 and 11.

Figure 11:
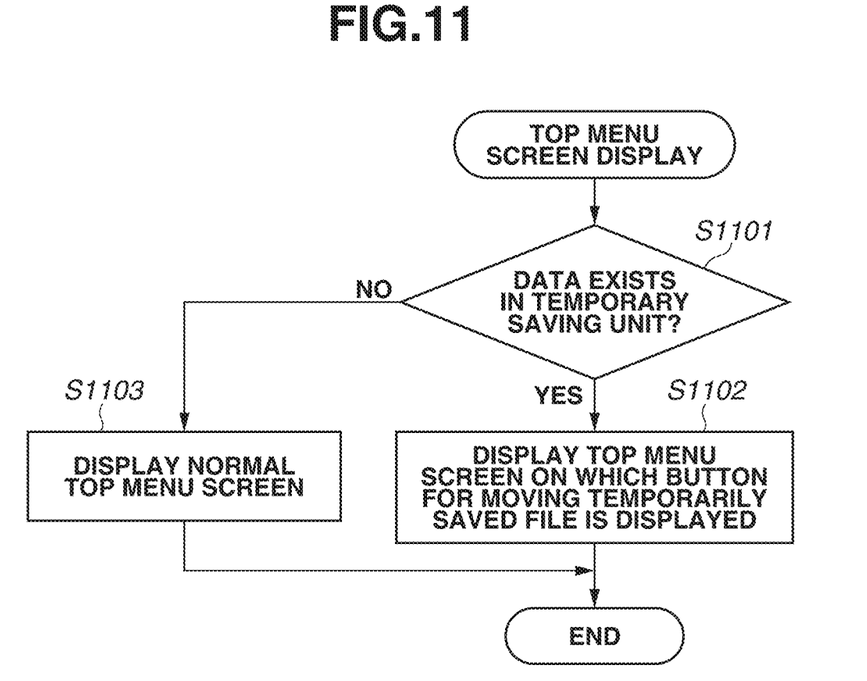
FIG. 11 is a flowchart illustrating a process flow of the application in the second exemplary embodiment.

FIG. 11 is a flowchart of display of a top menu screen of the application 401 in the present exemplary embodiment. The steps in FIG. 11 are performed by the CPU 202 executing a program stored in the ROM 203 or the storage device 209.

In step S1101, the control unit 404 determines whether there is image data saved in the file temporary saving unit 801. If the control unit 404 determines that there is image data (YES in step S1101), the processing proceeds to step S1102. In the other case (NO in step S1101), the processing proceeds to step S1103. In step S1103, a UI unit 402 displays a normal top menu screen (for example, a menu screen 501).

In step S1102, the UI unit 402 displays a top menu screen 1001 including a button for moving the image data saved in the file temporary saving unit 801. Unlike the menu screen 501, the menu screen 1001 presents a temporary saving file button 1002. When the user presses the temporary saving file button 1002, a folder selection screen using the SAF, like the screen 620, is displayed. When the user selects the desired folder and performs a confirmation operation on the folder selection screen, a screen illustrated in a screen 1010 is displayed and the image data saved in the file temporary saving unit 801 is moved to the selected folder.

By the above process, the user can move the image data that is saved in the temporary saving area due to unavailability of the destination to save data, to the desired folder.

By the above process, it is possible to save data in an appropriate manner even if the folder previously used by the application becomes unavailable.

In the above exemplary embodiments, as an example, image data is saved in the folder to which access is permitted via the folder selection screen using the SAF. Alternatively, the user may be allowed as appropriate to change the folder to save image data. As illustrated in FIG. 10, a button like a button 1003 for changing the destination to save image data may be displayed on the top menu screen or the like, so that, when the button is pressed, a folder selection screen using the SAF as illustrated in the screen 620 is displayed to allow the user to set the desired saving destination folder as appropriate.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A method for an information processing apparatus capable of executing an application, the method comprising:
    displaying a menu screen for selecting a function to be executed from among a plurality of functions of the application, wherein the plurality of functions includes a first function including a process of storing data in a folder and a second function not including the process of storing data in a folder;
    (a) in a case where a selection of the first function is accepted from the menu screen in a state where there is no folder associated with the application, causing the information processing apparatus to display a selection screen for selecting a folder to be associated with the application, wherein the application is associated with the folder selected on the selection screen, and the data of the application is stored in the selected folder thereafter; and
    (b) in a case where a selection of the second function is accepted from the menu screen in a state where there is no folder associated with the application, not causing the information processing apparatus to display the selection screen,
    wherein the state where there is no folder associated with the application occurs in a case where the application needs to newly acquire access permission to the folder due to a version upgrade of an operating system (OS) operating in the information processing apparatus.

2. The method according to claim 1, wherein the information processing apparatus is communicable with an image processing apparatus, and the first function is a function for saving image data received from the image processing apparatus in a folder.

3. The method according to claim 2, wherein the first function is a function for receiving image data from the image processing apparatus and the second function is a function for giving an instruction for transmitting image data to the image processing apparatus.

4. The method according to claim 1, wherein, the menu screen includes a first button for executing the first function, and the first button is a button for opening a setting screen for the first function.

5. The method according to claim 1, wherein the first function is a function for saving, in a folder, generated image data using a camera included in the information processing apparatus.

6. The method according to claim 1, wherein a permit button for permitting access to the folder selected on the selection screen is displayed.

7. The method according to claim 1, wherein the selection screen is a screen of a Storage Access Framework (SAF).

8. An information processing apparatus capable of executing an application, the information processing apparatus comprising:
  a display configured to display a menu screen for selecting a function to be executed from among a plurality of functions of the application, wherein the plurality of functions includes a first function including a process of storing data in a folder and a second function not including the process of storing data in a folder;
  at least one processor; and
  at least one memory storing instructions, when executed by the at least one processor, causes the information processing apparatus to:
  (a) in a case where a selection of the first function is accepted from the menu screen in a state where there is no folder associated with the application, causing the information processing apparatus to display a selection screen for selecting a folder to be associated with the application, wherein the application is associated with the folder selected on the selection screen, and the data of the application is stored in the selected folder thereafter,
  (b) in a case where a selection of the second function is accepted from the menu screen in a state where there is no folder associated with the application, not causing the information processing apparatus to display the selection screen,
  wherein the state where there is no folder associated with the application occurs in a case where the application needs to newly acquire access permission to the folder due to a version upgrade of an operating system (OS) operating in the information processing apparatus.

9. The information processing apparatus according to claim 8, wherein the information processing apparatus is communicable with an image processing apparatus, and the first function is a function for saving image data received from the image processing apparatus in a folder.

10. The information processing apparatus according to claim 9, wherein the first function is a function for receiving image data from the image processing apparatus and the second function is a function for giving an instruction for transmitting image data to the image processing apparatus.

11. The information processing apparatus according to claim 8, wherein, the menu screen includes a first button for executing the first function, and the first button is a button for opening a setting screen for the first function.

12. The information processing apparatus according to claim 8, wherein the first function is a function for saving, in a folder, generated image data using a camera included in the information processing apparatus.

13. The information processing apparatus according to claim 8, wherein a permit button for permitting access to the folder selected on the selection screen is displayed.

14. The information processing apparatus according to claim 8, wherein the selection screen is a screen of a Storage Access Framework (SAF).

15. A non-transitory computer-readable storage medium storing a program for executing a method for an information processing apparatus capable of executing an application, the method comprising:
  displaying a menu screen for selecting a function to be executed from among a plurality of functions of the application, wherein the plurality of functions includes a first function including a process of storing data in a folder and a second function not including the process of storing data in a folder;
  (a) in a case where a selection of the first function is accepted from the menu screen in a state where there is no folder associated with the application, causing the information processing apparatus to display a selection screen for selecting a folder to be associated with the application, wherein the application is associated with the folder selected on the selection screen, and the data of the application is stored in the selected folder thereafter; and
  (b) in a case where a selection of the second function is accepted from the menu screen in a state where there is no folder associated with the application, not causing the information processing apparatus to display the selection screen,
  wherein the state where there is no folder associated with the application occurs in a case where the application needs to newly acquire access permission to the folder due to a version upgrade of an operating system (OS) operating in the information processing apparatus.

* * * * *